US009283907B2

(12) United States Patent
Farrington et al.

(10) Patent No.: US 9,283,907 B2
(45) Date of Patent: Mar. 15, 2016

(54) ADJUSTABLE FRONT FASCIA FOR VEHICLES

(71) Applicant: Ford Global Technologies, LLC, Dearborn, MI (US)

(72) Inventors: Charles Edward Farrington, Altona Meadows (AU); Dale Travis Huggan, Sunbury (AU); James Francis Briggs, Glen Waverley (AU)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 14/253,098

(22) Filed: Apr. 15, 2014

(65) Prior Publication Data
US 2015/0291113 A1    Oct. 15, 2015

(51) Int. Cl.
*B60R 19/18*    (2006.01)
*B60R 19/24*    (2006.01)

(52) U.S. Cl.
CPC ............... *B60R 19/24* (2013.01); *B60R 19/18* (2013.01); *B60R 2019/1886* (2013.01); *B60R 2019/245* (2013.01)

(58) Field of Classification Search
CPC .. B60R 19/24; B60R 2019/245; B60R 19/38; Y10T 29/49622; Y10T 29/49895; Y10T 29/49904
See application file for complete search history.

(56) References Cited

U.S. PATENT DOCUMENTS

| 6,209,935 | B1 | 4/2001 | Kavc et al. |
| 6,695,396 | B1 * | 2/2004 | Schwab ............... B60Q 1/0433 296/193.09 |

FOREIGN PATENT DOCUMENTS

| DE | 3928876 A1 | 3/1991 | |
| DE | 102010051357 A1 * | 7/2011 | .............. B60R 19/24 |
| EP | 1070639 A1 | 1/2001 | |
| EP | 1946975 A2 | 7/2008 | |
| GB | 2281260 A | 1/1995 | |
| KR | 20120029946 A | 3/2012 | |

* cited by examiner

*Primary Examiner* — Jason L Vaughan
*Assistant Examiner* — Amanda Meneghini
(74) *Attorney, Agent, or Firm* — Jason Rogers; Price Heneveld LLP

(57) ABSTRACT

An adjustable front fascia for vehicles includes a second vehicle structure that is fixed to a first vehicle structure at a location that is predefined relative to a hood of the vehicle. During assembly, the front fascia is movably supported on the second vehicle structure utilizing a temporary retaining mechanism that prevents unintended fore-aft movement of the front fascia unless a force exceeding a predefined release force is applied to the fascia. The front fascia can be fixed at a location providing a predefined gap relative to a front edge of the hood. The vertical position of the fascia relative to the hood can also be adjusted during assembly.

17 Claims, 15 Drawing Sheets

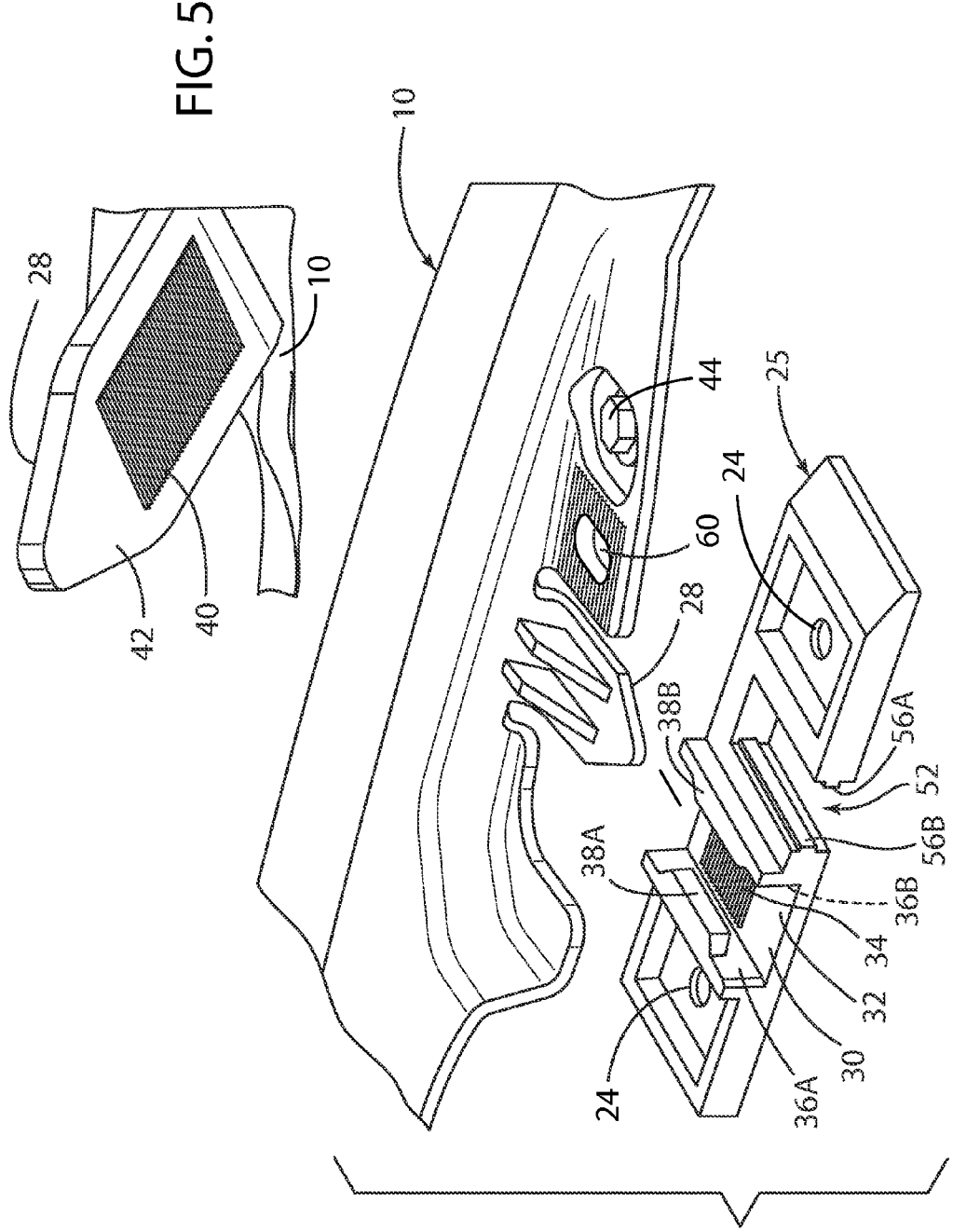

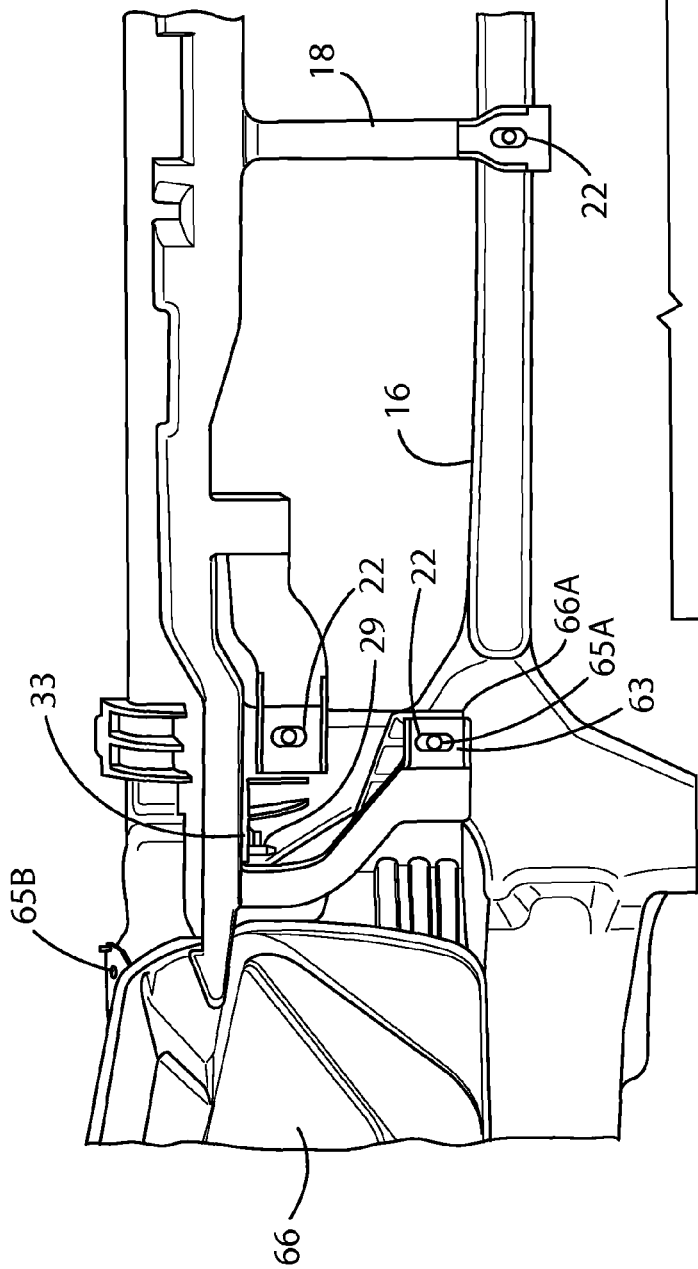
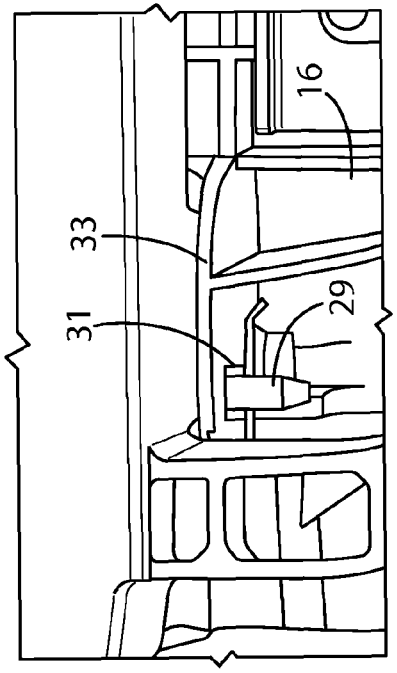
FIG. 9
FIG. 9A

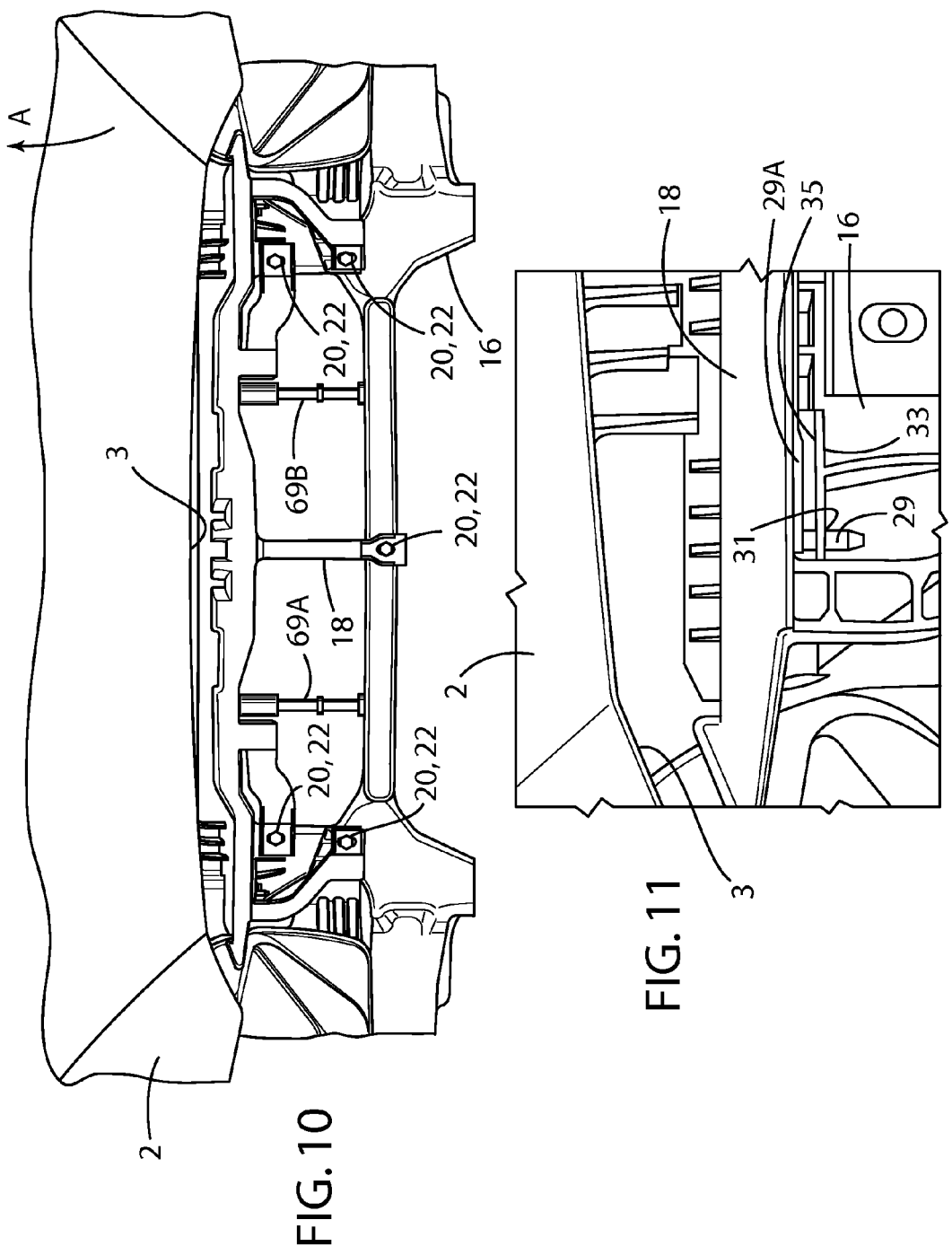

ADJUSTABLE FRONT FASCIA FOR VEHICLES

FIELD OF THE INVENTION

The present invention generally relates to motor vehicles, and more particularly to a front fascia or bumper system that is adjustable relative to the vehicle hood.

BACKGROUND OF THE INVENTION

Motor vehicles may include a front bumper/fascia extending over a significant portion of the front of the vehicle between the front side panels. The fascia may include a grill opening, openings for headlights, and other such features. The fascia may also include an internal structure forming a bumper. The fascia may include edge portions adjacent the other panels or surfaces of the vehicle.

SUMMARY OF THE INVENTION

One aspect of the present invention is a method of attaching a front fascia or bumper to a vehicle having a hood. The method includes providing a front fascia and a first vehicle structure. A second vehicle structure is fixed to the first vehicle structure at a location that is predefined relative to the hood of the vehicle. The front fascia is movably supported on the second vehicle structure utilizing a temporary retaining mechanism that prevents rearward movement of the front fascia towards a front edge of the hood unless a rearward force exceeding a first release force of the mechanism is applied to the fascia. The temporary restraining mechanism prevents forward movement of the fascia away from the front edge of the hood unless a forward force exceeding a second release force of the mechanism is applied to the fascia. The front fascia is shifted rearwardly towards a front edge of the hood until the fascia is located at a desired fore-aft position to define a gap having a predetermined magnitude is defined between the front fascia and the front edge of the hood. The front fascia is then fixed at the desired fore-aft position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a fragmentary view of a portion of the front fascia of FIG. 4;

FIG. 6 is a fragmentary, exploded isometric view of the fascia and adjustable bracket of FIG. 2;

FIG. 9 is a fragmentary isometric view of a front portion of a vehicle structure during the assembly process;

FIG. 9A is an enlarged view of a portion of the vehicle structure of FIG. 9;

FIG. 10 is a fragmentary isometric view of a front portion of a vehicle structure during the assembly process;

FIG. 11 is an enlarged view of a portion of the vehicle structure of FIG. 10;

FIG. 15; and

DETAILED DESCRIPTION OF THE PREFERRED EMBODIMENTS

Figure 1:
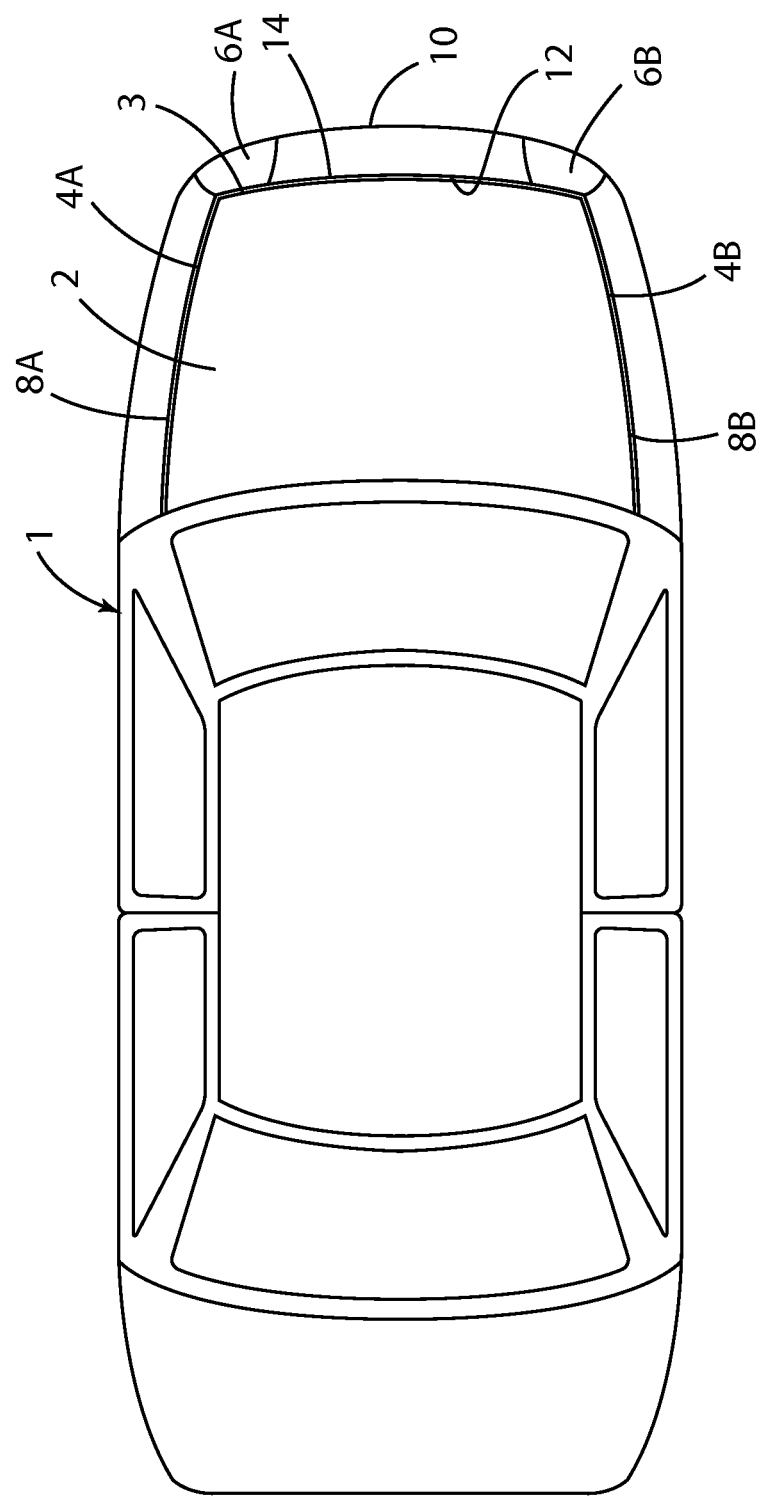
FIG. 1 is a top plan view of a motor vehicle including a front fascia according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 17:
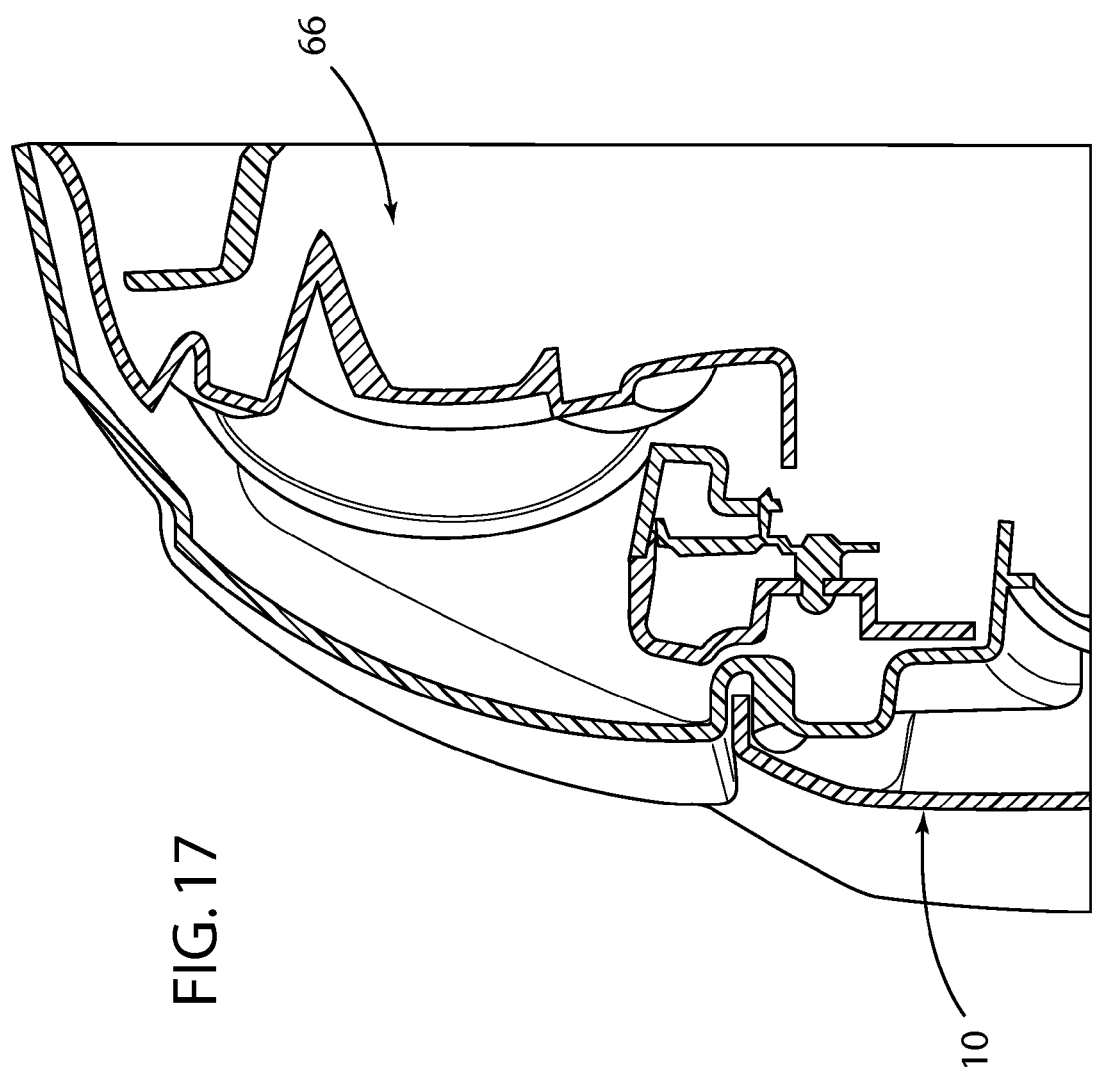
FIG. 17 is a cross sectional view of a portion of the front fascia assembly.

With reference to FIG. 1, a vehicle 1 includes a hood 2 having a front edge 3 and side edges 4A and 4B. A front fascia 10 is mounted to the vehicle 1. Front fascia 10 has an upper rear edge 12 that is disposed adjacent the front edge 3 of hood 2 to define a gap 14. Fascia 10 may comprise molded polymer forming external surfaces, and it may further include a metal external structure forming a bumper. As discussed in more detail below, the fore-aft position of front fascia 10 may be adjusted during assembly such that gap 14 has a desired predefined dimension along the length of gap 14. The size of gap 14 may be approximately equal to the size of gaps 8A and 8B along the side edges 4A and 4B, respectively, of hood 2. Alternatively, the gaps may be unequal. As also discussed in more detail below, the vertical position of front fascia 10 may be adjusted relative to the hood 2 to ensure that the front edge 3 of the hood 2 has a vertical position that is substantially equal to the vertical position of upper rear edge 12 of fascia 10 (see also FIG. 17).

Figure 2:
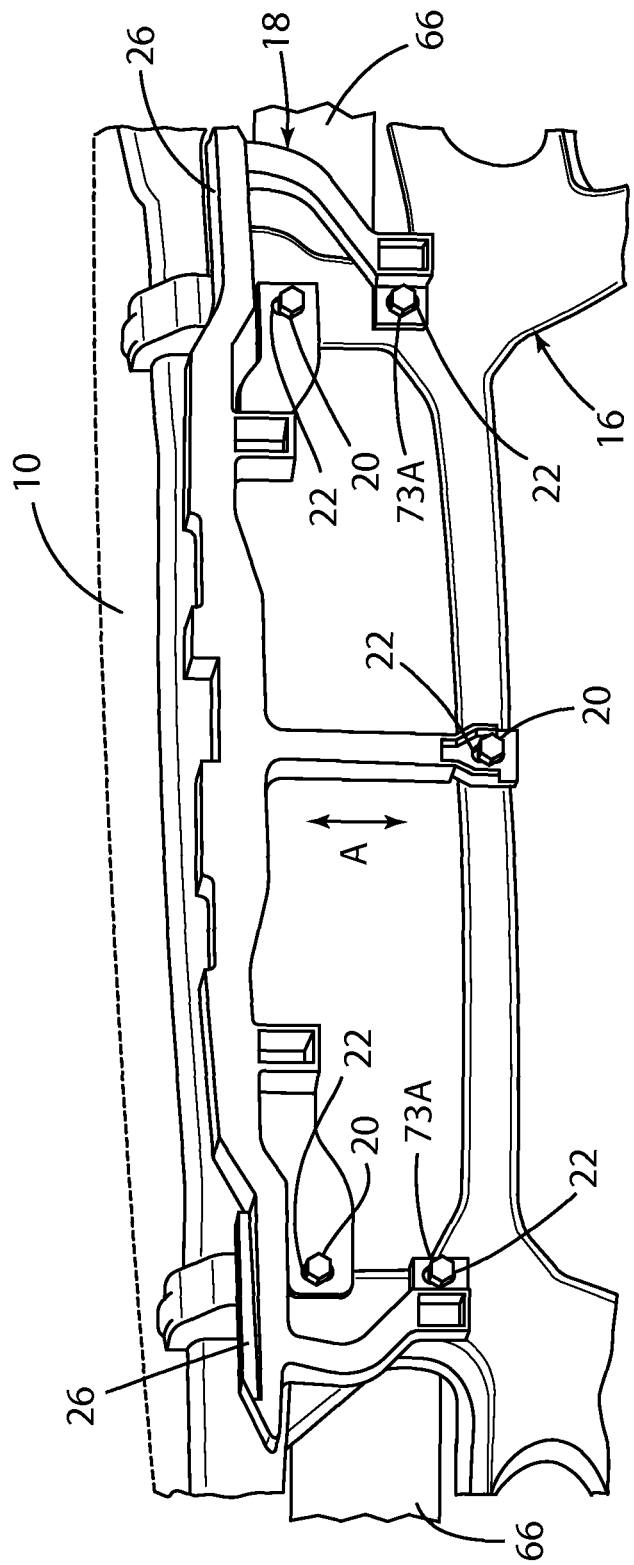
FIG. 2 is a partially fragmentary isometric view of first and second vehicle structures at a front of the motor vehicle of FIG. 1.

With further reference to FIG. 2, vehicle 1 includes a first or main structure 16, and an upper bumper support/second structure 18 that is connected to the first structure 16 utilizing threaded fasteners 20 that extend through vertically slotted openings 22 in second structure 18. First structure 16 may include a plurality of threaded openings (e.g. clip nuts) that threadably receive threaded fasteners 20. First structure 16 may comprise a polymer or steel grille opening reinforcement structure that is rigidly secured to a front subframe or other vehicle structure capable of supporting fascia 10. When assembled, the front fascia or bumper 10 is secured to the second structure 18. As discussed in more detail below, during assembly the second structure 18 is initially placed on the first structure 16, and the vertical position of the second structure 18 relative to the first structure 16 is adjusted relative to a vertical position of the hood 2 as shown by the arrow "A." Threaded fasteners 20 are then tightened to secure second structure 18 to first structure 16. As also discussed below, the vertical position of second structure 18 relative to first structure 16 may be set utilizing fixtures 69A and 69B (FIG. 11). Fascia 10 is then positioned on second structure 18, the height of fascia 10 is adjusted relative to hood 2, and fascia 10 is then secured to second structure 18. This initial setting of the vertical position of second structure 18 relative to the first or primary structure 16 utilizing the hood 2 as a reference ensures that the vertical position of the front fascia 10 is initially set at a height that is relatively close to the final desired vertical position of the front fascia 10 relative to the front edge 3 of hood 2. The first or primary structure 16 may comprise metal or the like, and the second structure 18 may be molded from a polymer material, or it may be formed from metal. The threaded fasteners 20 may comprise clip nuts and threaded bolts of a known type. The front portion of vehicle 1 including fascia 10, first structure 16, second structure 18, and other components are substantially mirror images about a centerline of vehicle 1.

Figure 3:
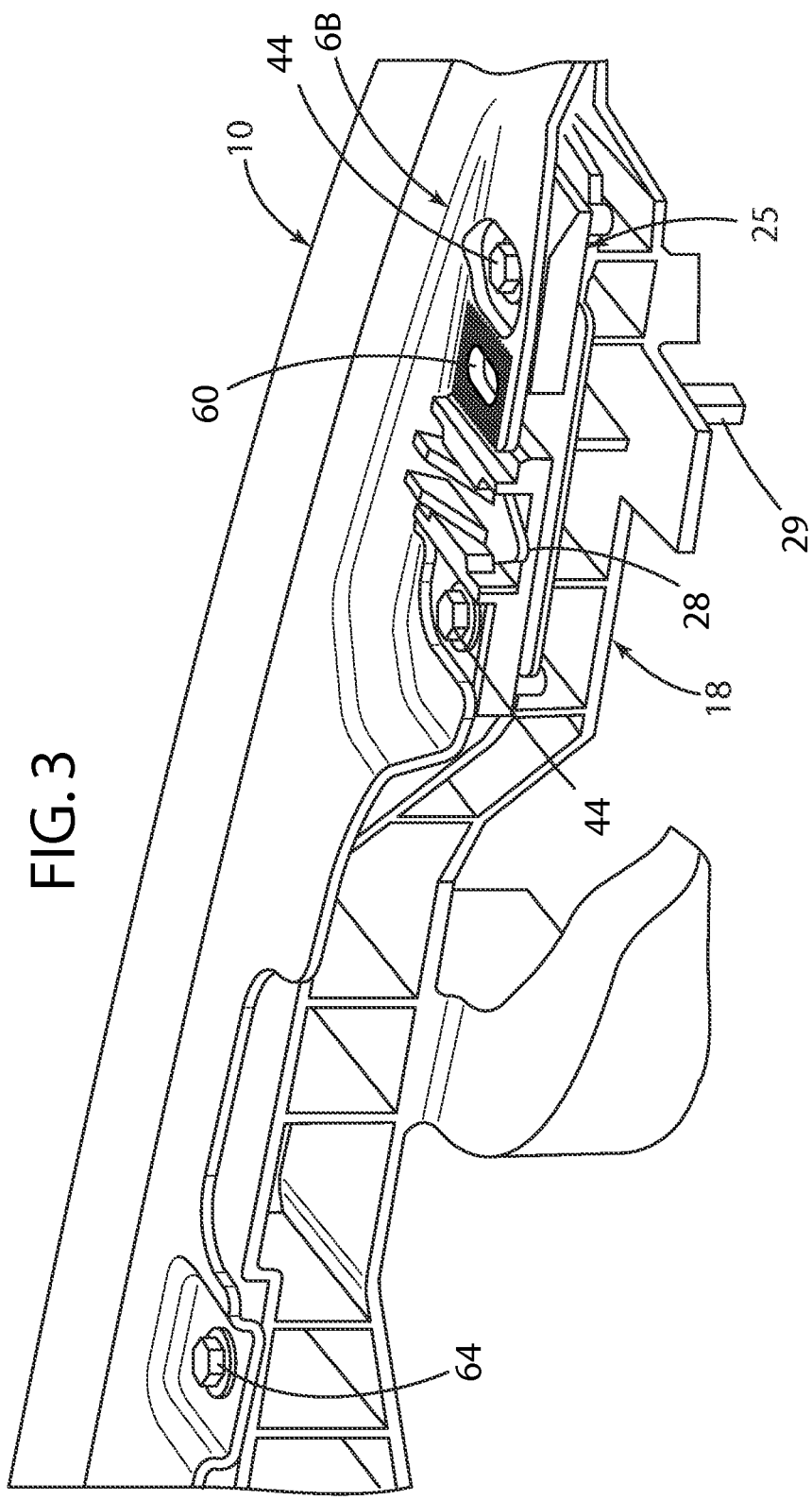
FIG. 3 is a fragmentary, enlarged isometric view of a portion of the vehicle structure of FIG. 1 showing a portion of the fascia.
Figure 4:
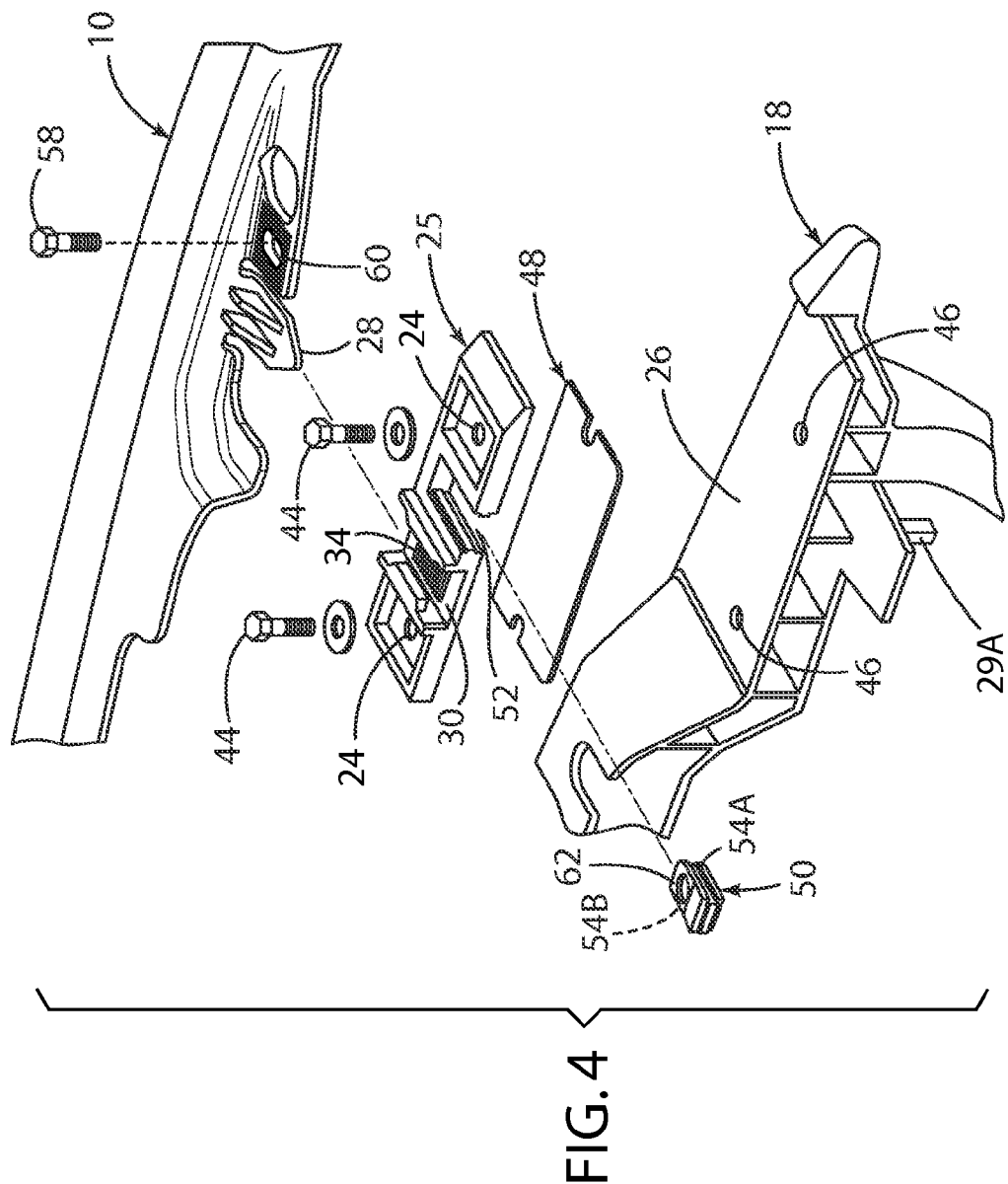
FIG. 4 is a fragmentary, exploded isometric view of the vehicle structure of FIG. 3 showing an adjustable fascia mounting bracket.

With further reference to FIGS. 3 and 4, fascia 10 is adjustable connected to pads or connection areas 26 of second structure 18 utilizing a pair of brackets 25 positioned at opposite upper end portions 6A and 6B (FIG. 1) of fascia 10. The end portions 6A and 6B are mirror images of one another, as are the brackets 25 located at end portions 6A, 6B. Thus, it will be understood that the following discussion of bracket 25 and end 6B of fascia 10 pertains to the bracket 25 at end 6A of fascia 10. Each end 6A, 6B of fascia 10 includes a rearwardly extending tab 28 that is slidably received in a guide structure 30 of bracket 25. With further reference to FIG. 6, guide structure 30 includes a base surface 32 having a plurality of upwardly facing teeth 34. The guide structure 30 further includes opposing sidewalls 36A and 36B, and retaining tabs 38A and 38B. As discussed in more detail below, during assembly tab 28 is slidably received in guide structure 30, and teeth 40 (FIG. 5) on lower surface 42 of tab 28 engage teeth 34 to temporarily, yet adjustably, retain the front fascia 10 in a fore-aft position relative to the second structure 18. During assembly, fascia 10 is initially "hung" from tabs 28, such that teeth 40 of each tab 28 engage the teeth 34 of the brackets 25 with a force that is equal to one-half the weight of fascia 10.

The guide structure 30 of bracket 25 permits fore-aft sliding movement of tab 28, but prevents side-to-side movement and also prevents vertical movement of fascia 10. The teeth 34 and 40 are configured to prevent fore-aft movement of front fascia 10 relative to bracket 25 and second structure 28 unless a horizontal force exceeding a predefined amount is applied to the front fascia 10. In the illustrated example, when fascia 10 is being supported by tabs 28 during assembly, the force required to move the fascia 10 rearwardly or forwardly is in a range of about 20 N to about 100 N, and the forces are more preferably about 60 N. It will be understood that other arrangements may be utilized to provide temporary fore-aft positioning of fascia 10. For example, tabs 28 and/or bracket 25 may comprise high friction materials rather than teeth 34 and 40 to temporarily locate fascia 10 during assembly.

Referring again to FIG. 4, bracket 25 is secured to second structure 18 by threaded fasteners 44 that are received in threaded openings 46 of second structure 18. Threaded openings 46 may comprise clip nuts or other suitable threaded connector. As discussed in more detail below, a shim or spacer 48 may be positioned between bracket 25 and pad 26 of second structure 18 during assembly to vertically adjust the position of bracket 25 and front fascia 10 relative to hood 2. A threaded insert 50 is slidably received in a U-shaped opening 52 of bracket 25. The threaded insert 50 includes channels 54A and 54B on opposite sides thereof that slidably engage raised portions 56A and 56B of U-shaped opening 52 such that threaded insert 50 can slide in a fore-aft direction relative to bracket 25. As discussed in more detail below, during assembly a threaded fastener such as bolt 58 is inserted through slotted opening 60 of front fascia 10, and the bolt 58 engages threaded opening 62 of threaded insert 50. Tightening of bolt 58 fixes the fore-aft position of front fascia 10 relative to second structure 18. The opening 60 of front fascia 10 is elongated in a fore-aft direction to permit fore-aft adjustment of the position of front fascia 10 relative to second structure 18 prior to tightening of bolt 58. A plurality of threaded fasteners 64 further connect the front fascia 10 to second structure 18.

Figure 7:
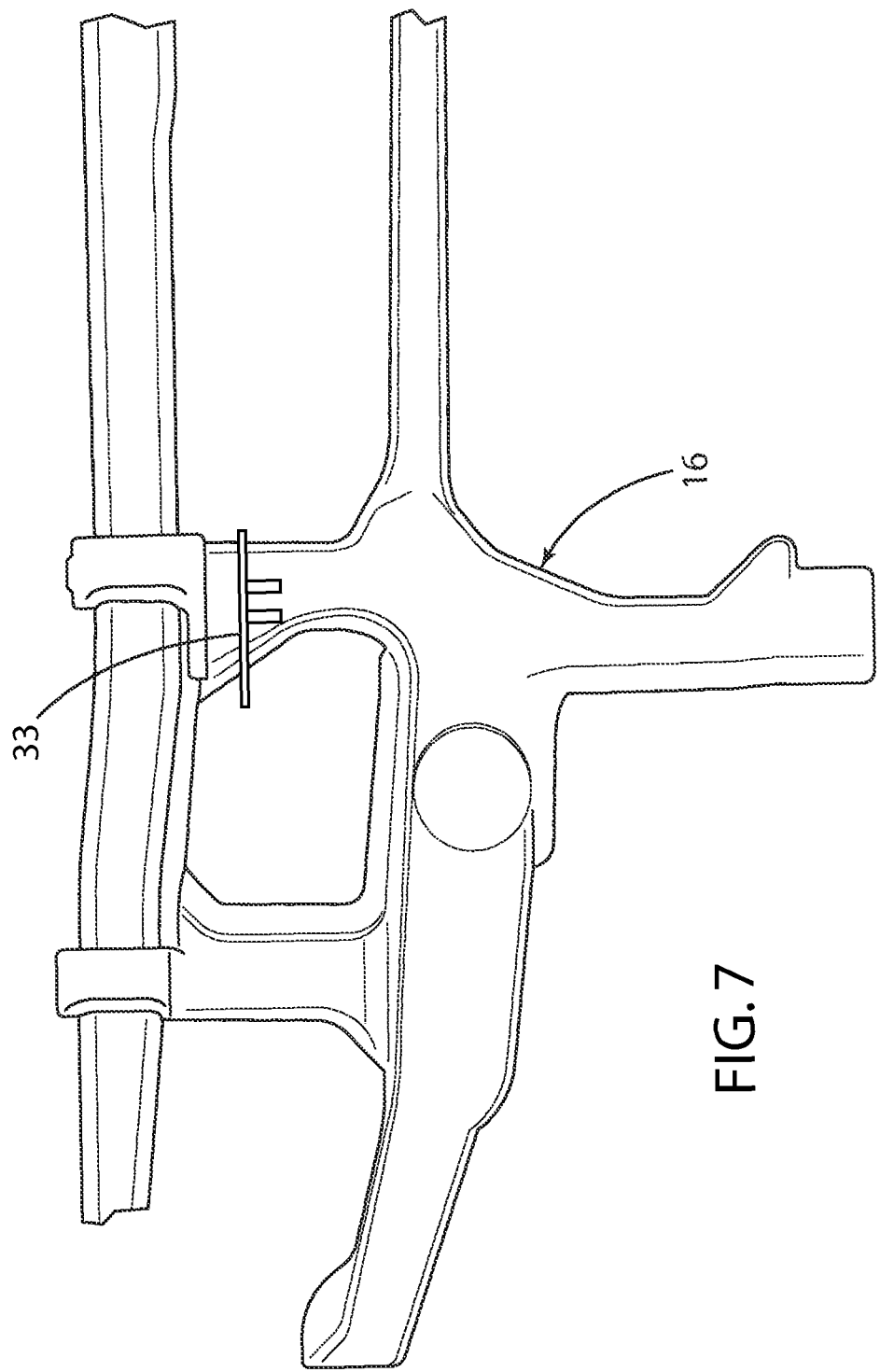
FIG. 7 is a fragmentary isometric view of a front portion of a vehicle structure at the start of the assembly process.
Figure 8:
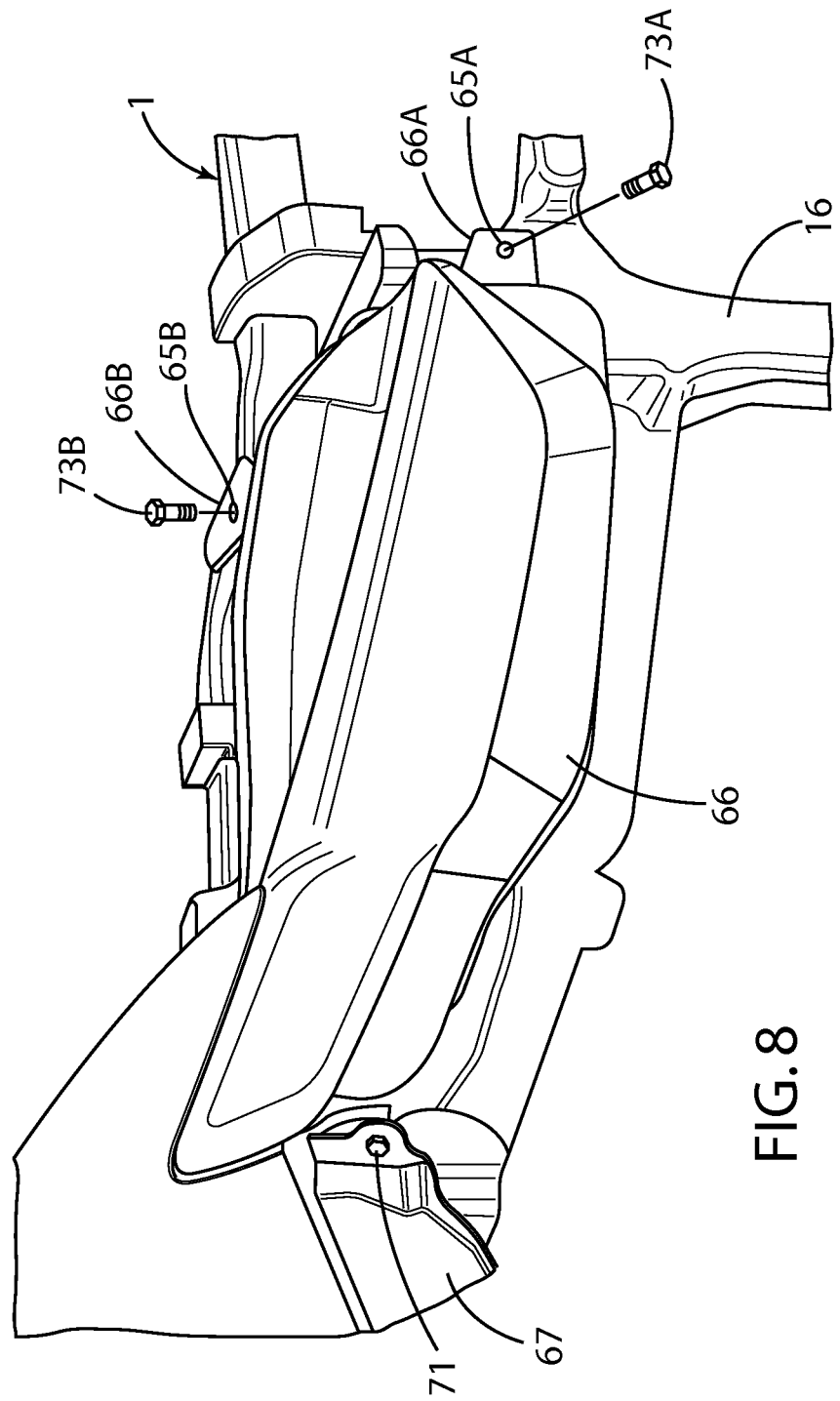
FIG. 8 is a fragmentary isometric view of a front portion of a vehicle structure during the assembly process.

With further reference to FIG. 7, during assembly the first structure 16 of vehicle 1 is initially in a vertical orientation with the hood 2 in an open position. With further reference to FIG. 8, a pair of headlamp assemblies 66 and fender brackets 67 are initially positioned on the left and right sides of the front of the vehicle 1. It will be understood that the left and right sides of the front of vehicle 1 are mirror images of one another. Headlamp assemblies 66 include tabs 66A and 66B having openings 65A and 65B that are configured to receive threaded fasteners 73A and 73B, respectively, during later steps of the assembly process after the vertical position of second structure 18 is set relative to first structure 16 as described in more detail below. A single threaded fastener 71 is initially installed and torqued to secure each headlamp assembly 66.

With further reference to FIGS. 9 and 10, the second structure 18 is then hung/positioned on the first structure 16. Second structure 18 includes a mounting flange 63 that overlies tab 66A of headlamp assembly 66. Second structure 18 is initially positioned on first structure 16 by inserting downwardly-extending pins 29 (see also FIG. 4) of second structure 18 into openings 31 of flanges 33 (see also FIG. 9A) of first structure 16 whereby the support flanges 29A (FIG. 4) of second structure 18 rest on top of flanges 33 of first structure 16. Engagement of pins 29 in openings 31 horizontally locates second structure 18 relative to first structure 16, but permits vertical movement/adjustment of second structure 18 relative to first structure 16.

With further reference to FIGS. 10 and 11, hood 2 is then closed, and the vertical position of the second structure 18 is then adjusted/set relative to the front edge 3 of hood 2 utilizing setting fixtures 69A and 69B. Setting fixtures 69A and 69B move second structure 18 up and/or down relative to first structure 16 as required to properly set the vertical position of second structure 18 relative to the hood 2. Setting fixtures 69A and 69B may include contact surfaces (now shown) that contact hood 2 and second structure 18 when second structure 18 is properly located. Alternatively, visual alignment/positioning features or position sensing/measurement devices may be utilized to determine when second structure 18 is properly located relative to front edge 3 of hood 2. As shown in FIG. 11, upward movement of second structure 18 relative to first structure 16 results in a gap 35 between flanges 29A of second structure 18 and flange 33 of first structure 16. Once second structure 18 is located at its proper vertical position relative to first structure 16, threaded fasteners 73A and 73B (FIG. 8) are then installed and tightened (torqued) to secure headlamp assembly 66 in place. Threaded fasteners 73A extend through a slotted opening 22 in flange 63 of second structure 18 and through opening 65A (FIG. 8) of flange 66A of headlamp assembly 66, such that threaded fasteners 73A prevent vertical movement of second structure 18 relative to first structure 16 when fasteners 73A are tightened.

The hood 2 is then opened as indicated by the arrow "A" (FIG. 10), and threaded fasteners 20 are then inserted into slots 20 and tightened to ensure that second structure 18 is fixed at a desired vertical position relative to front edge 3 of hood 2.

Figure 12:
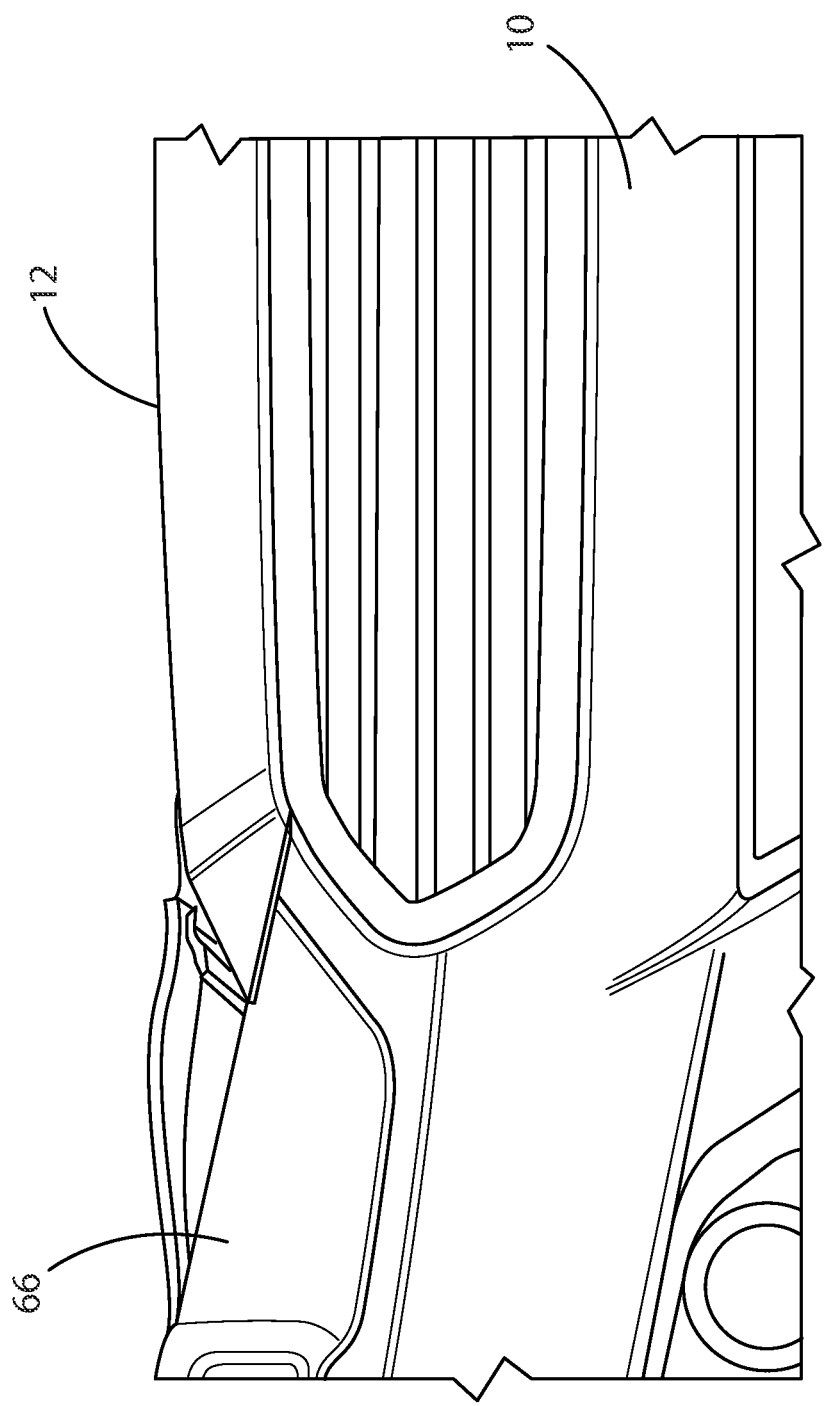
FIG. 12 is a fragmentary isometric view of a front portion of a vehicle and front fascia during the assembly process.
Figure 13:
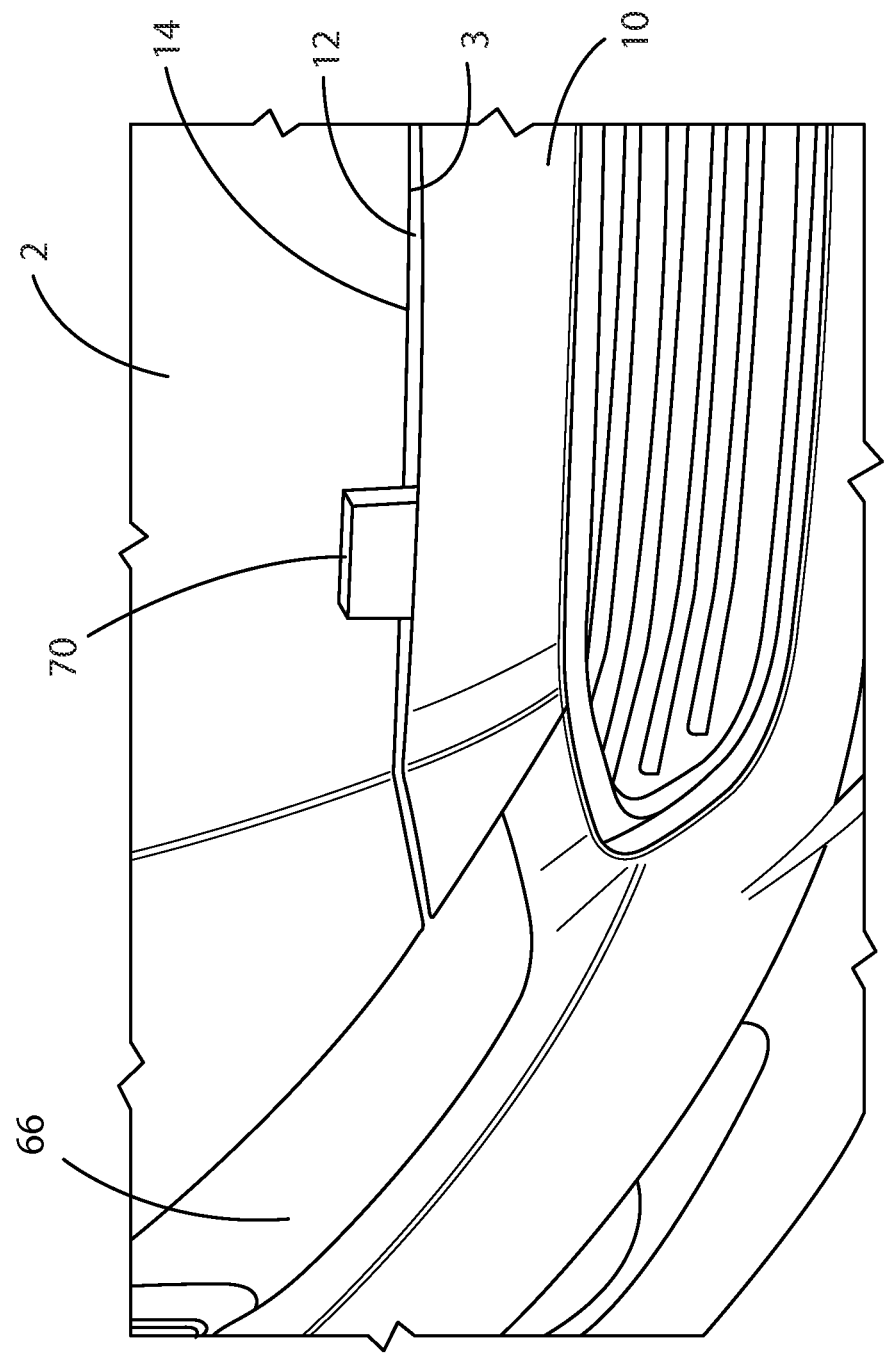
FIG. 13 is a fragmentary isometric view of a front portion of a vehicle and front fascia during the assembly process.

With further reference to FIG. 12, the hood 2 is then raised and the front fascia 10 is initially fitted in position over the first structure 16, second structure 18, and the headlamp assemblies 66. Fascia 10 is initially positioned on second structure 18 by slidably positioning tab 28 in guide structure 30 as discussed above in connection with FIGS. 3 and 4. Shims 48 (FIG. 4) may be utilized to provide final adjustment of the vertical position of fascia 10 relative to second structure 18. With further reference to FIG. 13, the hood 2 is then closed, and the size of the gap or margin 14 between front edge 3 of hood 2 and upper rear edge 12 of front fascia 10 is then set at a predefined target or desired magnitude. This may be accomplished by positioning a spacer ("finger blade") 70 into the gap 14, and a rearward force may be applied to the front fascia 10 to shift the fascia 10 rearwardly until the edge 12 of fascia 10 and front edge 3 of hood 2 contact the opposite sides of spacer 70. A plurality of spacers 70 may be utilized at various locations along gap 14 to ensure that the gap 14 is uniform along the entire front edge 3 of hood 2. As discussed below, the teeth 34 (FIG. 6) of bracket 25 and the teeth 40 of tab 28 of front fascia 10 provide a temporary retaining mechanism that prevents movement of front fascia 2 unless a force exceeding a predefined magnitude is applied in the fore or aft direction.

Figure 14:
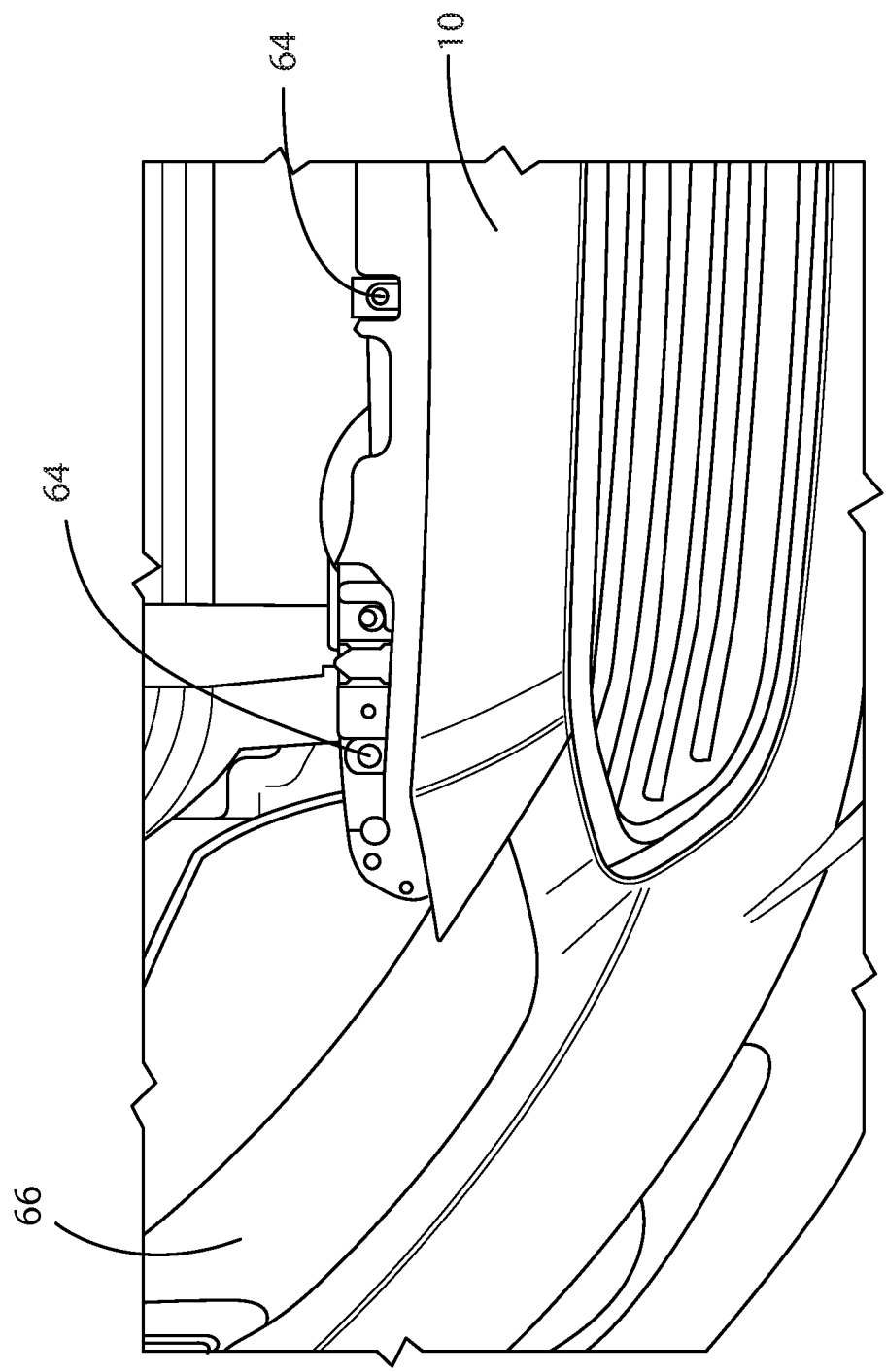
FIG. 14 is a fragmentary isometric view of a front portion of a vehicle and front fascia during the assembly process.
Figure 15:
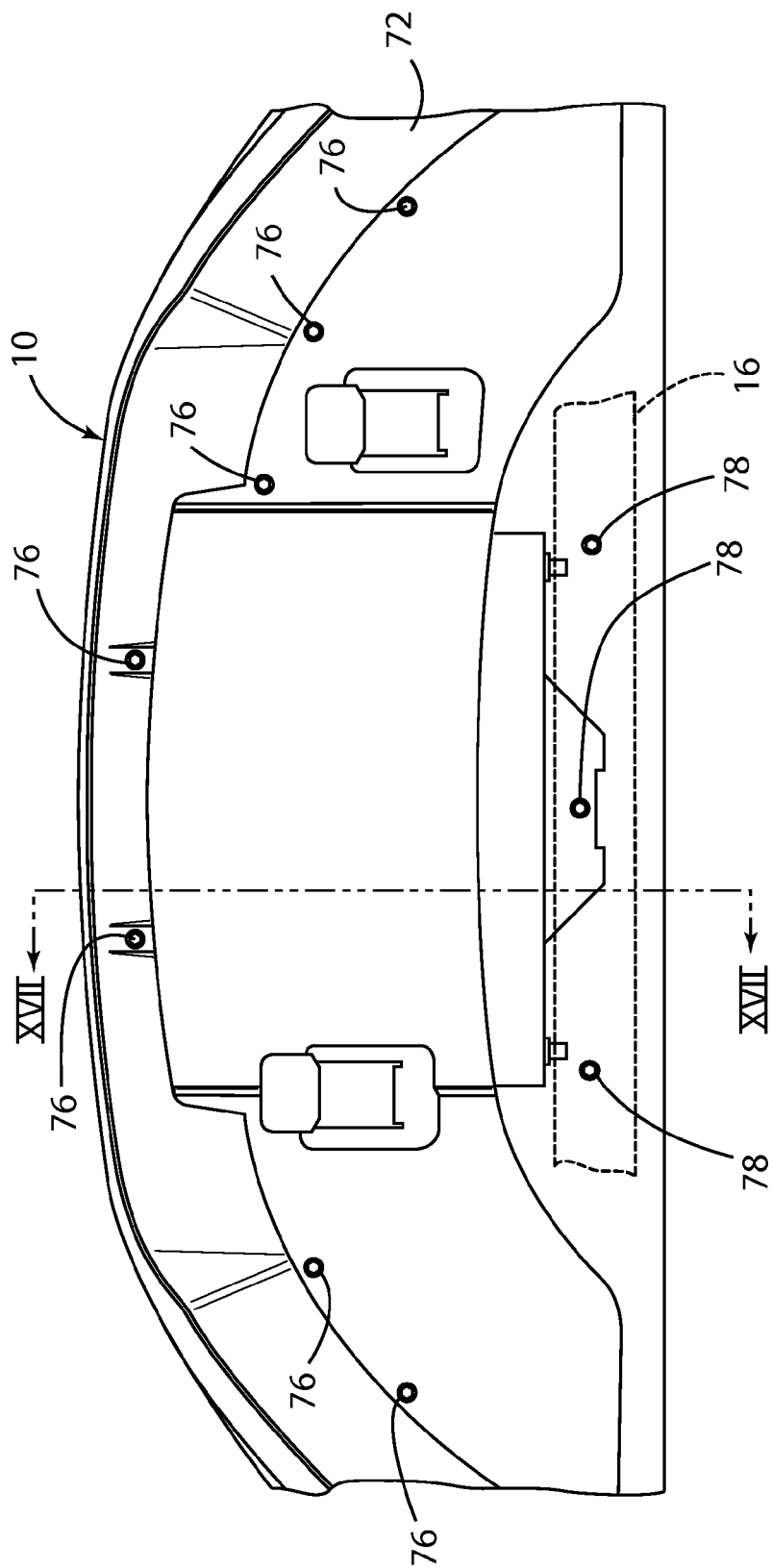
FIG. 15 is a fragmentary plan view of a front fascia and lower deflector.
Figure 16:
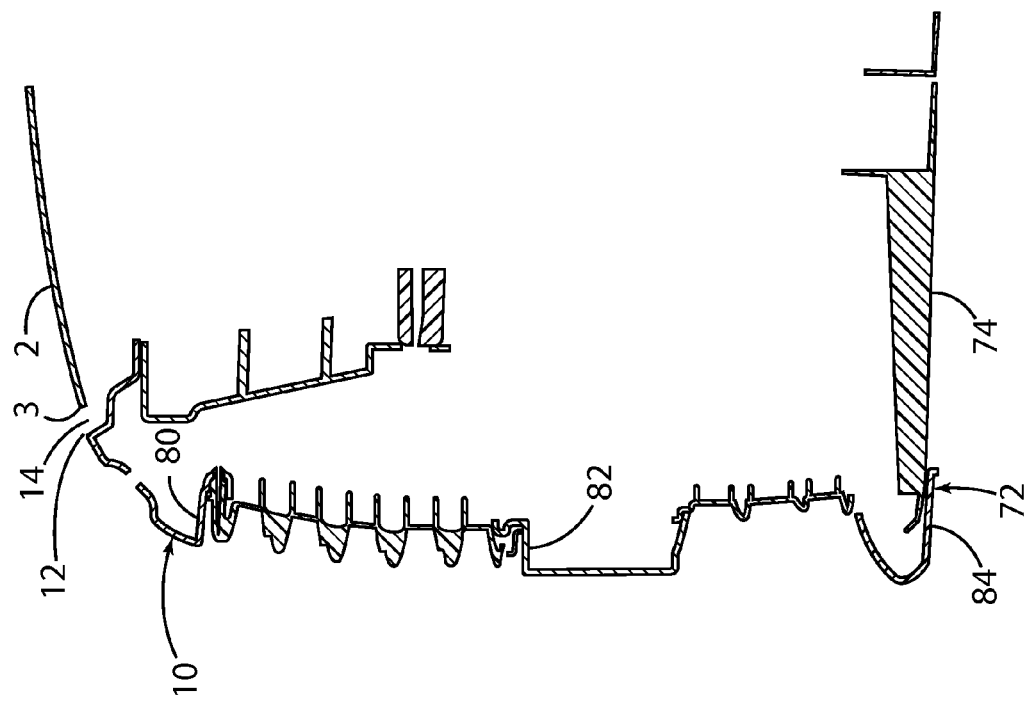
FIG. 16 is a cross sectional view taken along the line XVII-XVII.

With further reference to FIG. 14, the hood 2 is then opened, and threaded fasteners 58 (FIG. 4) are then tightened to lock the fore-aft position of fascia 10. Additional threaded fasteners 64 are also installed and tightened to secure fascia 10 to second structure 18. With further reference to FIGS. 15 and 16, lower portion 72 of front fascia 10 is secured to a lower deflector 74 utilizing a plurality of threaded fasteners 76. The lower deflector 74 may comprise a rigid polymer structure that is secured to first structure 16 utilizing threaded fasteners 78.

As discussed above in connection with FIG. 4, shims 48 may be positioned under bracket 25 to adjust the vertical position of bracket 25 and thereby adjust the vertical position of upper rear edge 12 of fascia 10 relative to hood 2 if required. In general, the final vertical position of the upper rear edge 12 of fascia 10 relative to the front edge 3 of hood 2 can be set at the time the gap 14 is set as discussed above in connection with FIG. 13 (i.e. prior to securing fasteners 64 as shown in FIG. 14). The vertical adjustment of upper edge 12 of front fascia 10 causes flexing of the fascia 10 at upper horizontal wall section 80 and/or lower horizontal wall section 82 and/or bottom horizontal wall portion 84. The lower deflector 74 is relatively rigid, such that the flexing permits adjustment of the position of upper rear edge 12 of fascia 10 relative to front edge 3 of hood 2 despite the fact that lower portion 72 of fascia 10 remains at substantially the same vertical position.

The front fascia connecting arrangement of the present invention permits fore-aft adjustment of the upper portion of front fascia 10 to form a consistent, predefined gap 14 relative to the front edge 3 of hood 2. Furthermore, the vertical adjustment capability of the upper rear edge 12 of front fascia 10 ensures that the vertical position of front fascia 10 relative to the front edge 3 of hood 2 is also within, predefined tolerances.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of attaching a front fascia to a vehicle having a hood; the method comprising:
    providing the front fascia; providing a first vehicle structure; fixing a second vehicle structure to the first vehicle structure at a location that is predefined relative to the hood of the vehicle;
    movably supporting the front fascia on the second vehicle structure utilizing a temporary retaining mechanism that prevents rearward movement of the front fascia towards a front edge of the hood unless a rearward force exceeding a first release force of the mechanism is applied to the front fascia, the temporary retaining mechanism preventing forward movement of the front fascia away from the front edge of the hood unless a forward force exceeding a second release force of the mechanism is applied to front the fascia;
    shifting the front fascia towards a front edge of the hood until the front fascia is located at a desired fore-aft position;
    wherein, a desired gap having a predetermined magnitude is defined between the front fascia and the front edge of the hood; and fixing the front fascia at the desired fore-aft position;
    wherein the temporary retaining mechanism comprises a downwardly facing first engagement surface on the front fascia, and an upwardly facing second engagement surface on the second vehicle structure; and the method including causing the first and second engagement surfaces to engage one another.

2. The method of claim 1, wherein: the first and second engagement surfaces comprise a plurality of teeth.

3. The method of claim 2, wherein: the teeth are configured such that the first release force is in a range of about 20 N to about 100 N.

4. The method of claim 3, wherein: the first release force is about 60 N.

5. The method of claim 4, wherein: the second release force is about 60 N.

6. The method of claim 1, including: positioning a spacer between the front edge of the hood and the front fascia whereby shifting the front fascia towards the front edge of the hood causes the front fascia and the front edge of the hood to engage the spacer to thereby form the desired gap.

7. The method of claim 1, wherein: the temporary retaining mechanism comprises a bracket that includes the second engagement surface; and the method including: adjusting a vertical position of the bracket relative to the second vehicle structure to thereby adjust a vertical position of the front fascia.

8. The method of claim 7, wherein: the second vehicle structure has an upper surface; and the method including: positioning at least one shim between the upper surface and the bracket to adjust a vertical position of the temporary retaining mechanism relative to the second vehicle structure.

9. The method of claim 7, wherein: the front fascia includes a rearwardly extending tab, and wherein the first engagement surface is on a lower side of the rearwardly extending tab; the bracket includes a guide structure configured to engage the rearwardly extending tab for guiding fore and aft movement of the front fascia relative to the bracket; and the method including: causing the rearwardly extending tab to engage the guide structure; and shifting the rewardly extending tab rearwardly in the guide structure.

10. The method of claim 1, wherein: the front fascia comprises a shell having an upper portion defining a generally horizontal rear edge that extends adjacent the front edge of the hood, the shell having a horizontally extending lower portion, and a generally vertical central portion extending between the upper and lower portions; and including: fixing the lower portion of the shell to the first vehicle structure; and vertically shifting the upper portion of the shell after fixing the lower portion of the shell to the first vehicle structure to flex the shell and to vertically align the rear edge of the shell with the front edge of the hood.

11. The method of claim 10, wherein: the central portion of the shell includes at least one flange that extends in a fore-aft direction to define a horizontally extending flexible hinge line, and the method including: causing the shell to flex along the hinge line.

12. The method of claim 10, including: fixing a substantially rigid polymer lower deflector to a vehicle subframe to define the first vehicle structure.

13. A method of mounting a front fascia to a first vehicle structure, comprising:
fixing a second structure to the first vehicle structure at a vertical location that is predefined relative to a hood of the vehicle;
movably supporting the front fascia on the second structure; adjusting vertical and horizontal positions of the front fascia relative to the hood of the vehicle;
fixing the front fascia to the second structure;
the front fascia has a first connector having a tab having a plurality of first teeth on a lower surface thereof and the second structure has a second connector having a plurality of second teeth and having a guide structure that receives the tab;
the front fascia is movably supported on the second structure by the first and second connectors; and
the plurality of first and second teeth engage one another to prevent fore-aft movement of the fascia unless a horizontal force exceeding a predefined magnitude is applied to the front fascia; and the method including: moving the front fascia rearwardly by applying a force to the front fascia while it is movably supported on the second structure.

14. The method of claim 13, wherein: the second connector comprises a bracket mounted to the second structure; and the method including: adjusting a vertical position of the bracket relative to the second structure to position the front fascia at a desired vertical position relative to the hood of the vehicle.

15. The method of claim 13, wherein: the vehicle includes the hood defining a front edge; the front fascia defines a rear edge that is spaced apart from the front edge of the hood by a gap; and the method including: positioning a spacer having a transverse dimension in the gap; shifting the front fascia rearwardly until the spacer is in contact with the front edge of the hood and the rear edge of the front fascia such that a size of the gap is substantially equal to the transverse dimension.

16. The method of claim 13, including: fixing a lower portion of the front fascia to a substantially rigid vehicle structure; vertically adjusting a location of an upper portion of the front fascia to align the upper portion of the fascia with the hood of the vehicle.

17. The method of claim 16, wherein: the front fascia includes a generally horizontal portion extending in a fore-aft direction; the generally horizontal portion flexing as the locating of the upper portion of the front fascia is adjusted.

\* \* \* \* \*